United States Patent
Miller et al.

(10) Patent No.: US 6,995,213 B2
(45) Date of Patent: Feb. 7, 2006

(54) ORIENTED FILMS PREPARED USING IMPACT COPOLYMER POLYPROPYLENE

(75) Inventors: Mark B. Miller, Houston, TX (US); Scott Cooper, Humble, TX (US); Juan Jose Aguirre, League City, TX (US); Mark Leland, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 10 days.

(21) Appl. No.: 10/674,027

(22) Filed: Sep. 29, 2003

(65) Prior Publication Data

US 2005/0069723 A1  Mar. 31, 2005

(51) Int. Cl.
*C08L 23/16*  (2006.01)

(52) U.S. Cl. .................. 525/240; 428/910; 264/435; 264/901; 528/232; 524/536

(58) Field of Classification Search ............... 525/240; 524/536; 428/910; 264/435, 901; 528/232
See application file for complete search history.

(56) References Cited

U.S. PATENT DOCUMENTS

| 5,219,666 | A | | 6/1993 | Schirmer et al. |
| 5,548,042 | A | | 8/1996 | Goode |
| 5,573,723 | A | | 11/1996 | Peiffer et al. |
| 5,948,839 | A | | 9/1999 | Chatterjee |
| 6,037,417 | A | * | 3/2000 | Nguyen et al. ............. 525/240 |
| 6,072,005 | A | * | 6/2000 | Kobylivker et al. ........ 525/240 |
| 6,218,017 | B1 | | 4/2001 | Yamashita et al. |
| 6,472,474 | B2 | | 10/2002 | Burkhardt et al. |
| 6,593,442 | B2 | * | 7/2003 | Bidell et al. ............. 526/348.1 |

* cited by examiner

Primary Examiner—Robert D. Harlan
(74) Attorney, Agent, or Firm—Madan, Mossman & Sriram, P.C.

(57) ABSTRACT

Disclosed is a method of producing a novel biaxially oriented film having a high diffraction of light, and flexibility. In particular, the invention disclosed provides a method for making an opaque impact copolymer film by stretching in two dimensions an impact polypropylene copolymer. The invention is disclosed to be useful for making a material particularly suitable for a variety of applications including labeling media, food packaging and laminates. Also disclosed is a multilayer film having a first impact polypropylene copolymer layer and a second layer of another polymer wherein the multilayer film has significantly reduced haze. Also disclosed is film produced with a filler that has increased porosity and flexibility.

19 Claims, No Drawings

ORIENTED FILMS PREPARED USING IMPACT COPOLYMER POLYPROPYLENE

BACKGROUND OF THE INVENTION

1. Field of the Invention

The present invention relates to oriented films with improved attributes prepared using impact copolymer polypropylene. The present invention particularly relates to biaxially oriented films with improved attributes prepared using an impact copolymer polypropylene.

2. Background of the Art

Impact polypropylene copolymers are commonly used in a variety of applications from automobile parts, household appliances, toys, batteries, and packaging where properties such as strength, electrical insulation, and impact resistance are desired. Commercial grades of these polymers are available in a wide range of physical properties including melt flows, impact strengths and molecular weight distributions.

Impact polypropylene can be prepared by mechanically admixing a polypropylene homopolymer and a rubber. Commonly, the two components are admixed in the form of pellets and then melt blended, extruded, and pelletized. Such a process, while comparatively inexpensive, does not produce an impact polypropylene having the same properties as an impact polypropylene copolymer.

Impact polypropylene copolymers are made of at least two components, a homopolymer polypropylene component and a copolymer component. These two components are typically made in sequential polymerization reaction processes. The first reaction produces the homopolymer and the second reaction produces the copolymer. The copolymer is thereby incorporated within the matrix of the homopolymer component. The homopolymer component imparts overall stiffness on the polymer, while the copolymer component imparts the rubbery characteristics as well as the desired impact resistance.

It is well known that processing variables influence the properties of the resulting impact copolymer. Manufacturing with varying ratios of the components, adding nucleating agents, and even adding a third monomer to the copolymer component are all known to the art. Each of these variables imparts unique properties to the resulting impact copolymer.

Biaxially orienting polymers or "stretching" imparts unique characteristics to polymers as well. Such stretching can occur either in the machine (longitudinal) direction, in the transverse direction or both. The resulting film is significantly decreased in thickness and is often used in applications such as carton-sealing tape, cigarette overwrap or food packaging. The level of light diffraction is low, commonly referred to as high gloss, resulting in the inability to write on the film. When the polymer is a impact polypropylene copolymer that has been filled, for example, the resulting film can be a breathable film having a water vapor permeability of greater than 17 grams per square meter per day for a 0.0025 cm film (15 g/m$^2$·d (25 µm film) and an oxygen permeability of greater than 8000 cc·25 µm/m$^2$·day.

In contrast to impact polypropylene copolymers, it is known to prepare biaxial films from homopolypropylene. For example, it is known in the art to form a biaxially oriented polypropylene film having a high-gloss (preferably of more than about 90), and a low haze (preferably less than 2%). Additional treatment, such as corona or flame treatment is required to achieve printability of such a film.

SUMMARY OF THE INVENTION

In one aspect the present invention is a biaxially oriented film of an impact copolymer polypropylene having a water-vapor permeability of greater than 5 g/m$^2$·d (25 µm film) and less than 25 g/m$^2$·d (25 µm film).

In another aspect, the present invention is a multilayer polymer film including a center or core or first layer of a biaxially oriented film of an impact copolymer polypropylene having a water-vapor permeability of greater than 5 g/m$^2$·d (25 µm film) and less than 25 g/m$^2$·d (25 µm film), and attached thereto, a second polymer film.

In still another aspect, the present invention is a method for preparing a biaxially oriented film of an impact copolymer polypropylene having a water-vapor permeability of greater than 5 g/m$^2$·d (25 µm film) and less than 25 g/m$^2$·d (25 µm film)(25 µm film). The film is prepared by stretching in two dimensions a polypropylene-ethylene-propylene copolymer.

DETAILED DESCRIPTION OF THE PREFERRED EMBODIMENTS

In one aspect, the present invention is a biaxially oriented impact polypropylene copolymer film that has a high diffraction of light, improved flexibility and increased porosity. Such properties make this material particularly suitable for a variety of applications including labeling media, food packaging and laminates. These unique properties are not currently available with conventional polymer films.

It can be desirable to have both a strong and flexible printable film. Propylene homopolymers alone cannot achieve this unique combination. In contrast, the process of the instant invention provides a high-impact copolymer of polypropylene and ethylene and can be used to prepare a biaxially oriented film that is strong, flexible and printable.

The films of the present invention are made using polymers having two components; a polypropylene homopolymer component, and a polypropylene-ethylene copolymer component. The polypropylene homopolymer portion of the invention resin can be made by any one of a number of conventional processes, including, but not limited to Ziegler-Natta (ZN) polymerizations. Metallocene catalyzed reactions can also be used.

The copolymer component is made by the addition of ethylene. Preferably, the ethylene is added in a ratio to the polypropylene homopolymer of about 1:2 to about 2:1. In one embodiment of the invention, the ethylene:polypropylene ratio is about 1 to 1. In another embodiment the ethylene:polypropylene ratio is about 1 to 2. In a third embodiment, the ethylene:polypropylene ratio is about 2 to 1. In an alternative embodiment of the present invention, the final ethylene content of the copolymer is from about 2 weight percent to about 20 weight percent. In another alternative embodiment, the final ethylene content of the copolymer of the present invention is from about 5 weight percent to about 15 weight percent. In still another embodiment of the present invention, the final ethylene content of the copolymer of the present invention is about 10 percent.

In the practice of the present invention, the copolymer component is incorporated via chemical reaction within the matrix of the homopolymer component, a decided advantage over the impact polypropylenes that are merely the products of mechanically admixing a homopolymer and a rubber. These sequential catalyst driven reactions can result in a much more homogeneous dispersion of the rubber component within the homopolymer matrix than the alternative method of mechanical dispersion. Consequently, sequential catalyst driven reactions form a uniform heterophasic polymer having sufficient strength to withstand the two-dimensional stretching process that results in films with uniform optical properties.

The films of the present invention have relatively poor light transmission. Stated another way, the films of the present invention look hazy when held up to a light source. Surprisingly, even a very thin layer of a second polymer when coextruded or otherwise placed in contact with the films of the present invention result in a multilayer film having good clarity. The films of the present invention can be coextruded or otherwise formed into multilayer films with polyethylene, homopolymer polypropylene, and other copolymers of ethylene and propylene, such as random ethylene and propylene copolymers or butylene and propylene and terpolymers of ethylene, propylene and another alpha-olefin; to form such multilayer films that have good clarity.

The advantages of such multilayer films include, but are not limited to, the advantages of the films of the present invention, but also with good clarity. For example, such a film would be very useful as a packaging material for frozen, refrigerated or fresh foods where good clarity is desired to, for example, view the contents of the package or an underlying label.

The films of the present invention have novel vapor permeabilities. This is particularly important in the development of specialized packaging of fresh products. In one embodiment of the present invention, the films of the present invention have a water-vapor permeability of greater than 15 g/m²·d (25 μm film) but less than 25 g/m²·d (25 μm film) and an oxygen permeability of greater than 5000 cc·25 μm/m²·day but less than 12000 cc·25 μm/m²·day.

EXAMPLES

The following examples are provided to illustrate the present invention. The examples are not intended to limit the scope of the present invention and they should not be so interpreted. Amounts are in weight parts or weight percentages unless otherwise indicated.

Example 1

Preparation of an Impact Polypropylene Copolymer

An Impact Polypropylene Copolymer polypropylene (homopolymer) portion of a resin is made by a Ziegler-Natta (ZN) polymerization reaction. The copolymer component of the resin is made by the subsequent addition of ethylene. The ethylene is added in a ratio to the polypropylene homopolymer of from about 1:2 to about 2:1 and the resulting Impact Polypropylene Copolymer resin is commercially available under the trade designation of ATOFINA 4320 polypropylene from ATOFINA Petrochemicals, Inc.

Example 2

Two Dimensional Stretching to Form Biaxial Oriented Film

The polypropylene-polypropylene/ethylene copolymer prepared in Example 1 is cast into a sheet. The resulting sheet is 35–50 mil (0.889–1.27 millimeters) thick. This sheet is then subjected to two-dimensional stretching. The first dimension is a longitudinal or machine direction (MD) orientation that results in about a 5:1 reduction in thickness. The material is then stretched in the lateral or transverse direction (TD) resulting in about a further 8:1 reduction in thickness. Overall, after the two-dimensional stretching, the thickness of the original resin is reduced about 40:1. The physical properties of this film are determined and displayed in Table 1.

Example 3

Comparison of a Polypropylene Homopolymer with the Bi-Axially Oriented Impact Copolymer of Example 2

A polypropylene homopolymer is used to prepare a film substantially identically to Example 2. The physical properties of this film are determined and displayed in Table 1. Strength and flexibility characteristics are compared in both the machine direction (MD) and the transverse direction (TD). These tests are performed by conventional methods known to those of ordinary skill in the art.

TABLE 1

| Product Resin Type | ASTM Test Method | Example 2 Impact Co-polymer Polypropylene | Comparative Example 3 Homopolymer Polypropylene |
|---|---|---|---|
| Melt Flow Rate (MFR) g/10 minutes | D-1238 | 3.50 | 3.00 |
| Mechanical Property MD (Machine Direction) | | | |
| 1% Secant Modulus, Psi (kPa) | D-882 | 144,408 (6,914) | 236,917 (11,344) |
| Tensile @Yield, Psi (kPa) | D-882 | 20,507 (982) | 23,438 (1,122) |
| Tensile @Break, Psi (kPa) | D-882 | 19,891 (952) | 23,384 (1,120) |
| Elongation @Yield, % | D-882 | 59 | 59 |
| Elongation @Break, % | D-882 | 60 | 59 |
| TD (Transverse Direction) | | | |
| 1% Secant Modulus, Psi (kPa) | D-882 | 142,352 (6,816) | 244,299 (11,697) |
| Tensile @Yield, Psi (kPa) | D-882 | 20,123 (963) | 24,282 (1,162) |
| Tensile @Break, Psi (kPa) | D-882 | 19,682 (942) | 24,120 (1,155) |
| Elong @Yield, % | D-882 | 60 | 59 |
| Elong @Break, % | D-882 | 61 | 59 |
| Barrier Property | | | |
| Water vapor permeability, g/m² · day (25 μm film) (water-vapor transmission rate) | F-1249 | 10 | 5 |

Example 4

Comparison of Haze For a Coated and an Uncoated Copolymer Film

A film as prepared in Example 2 is tested for light transmission. The substantially identical film is then coated by being coextruded with a random copolymer of ethylene and propylene on both sides and tested for film haze. The haze values of the coated and uncoated films are determined using ASTM test method D-1003. The coated film has a haze of 7.2 percent while the haze of the uncoated film is 15.7 percent.

Example 5

Comparison of a Bi-Axially Oriented Polypropylene Homopolymer Opaque Film with the Bi-Axially Oriented Impact Copolymer Opaque Film A filled biaxially oriented polypropylene homopolymer opaque film is prepared from a polypropylene homopolymer resin commercially available from ATOFINA Petrochemicals, Inc., under the trade designation FINA PP 3371. An Opaque Impact Copolymer Polypropylene filled biaxially oriented film is prepared using the Resin of Example 1 and the same conditions as is used to prepare the polypropylene homopolymer film. Physical properties of the two films are measured and displayed in Table 2.

TABLE 2

| Resin Type | Test Method | Opaque Impact Co-polymer Polypropylene | Opaque Homopolymer Polypropylene |
|---|---|---|---|
| Calcium carbonate, wt % | | 20 | 20 |
| Density | ASTM D1505 | 0.61 g/cm³ | 0.64 g/cm³ |
| Thickness, microns | ATOFINA | 40 | 38 |
| Optical Properties | | | |
| Light transmittance, % | ASTM D-1003 | 27 | 32 |
| Whiteness, whiteness index | ASTM E-313 | 88 | 87 |
| Gloss @45° | ASTM D2457 | 17 | 21 |
| Mechanical Properties | | | |
| MD (Machine Direction) | | | |
| 1% Secant Modulus, psi (kPa) | ASTM D-882 | 85000 (4,069) | 138000 (6,607) |
| Tensile Strength @ Break, psi (kPa) | ASTM D-882 | 7900 (378) | 9400 (450) |
| Elongation @ Break, % | ASTM D-882 | 70 | 90 |
| TD (Transverse Direction) | | | |
| 1% Secant Modulus, psi (kPa) | ASTM D-882 | 192000 (9,193) | 270000 (12,928) |
| Tensile Strength @ Break, psi (kPa) | ASTM D-882 | 16000 (766) | 19000 (910) |
| Elongation @ Break, % | ASTM D-882 | 20 | 20 |
| Barrier Properties | | | |
| Water Vapor Permeability, g/m² · d (25 μm film) | ASTM F-1249 | 19 | 9 |
| Oxygen Permeability, cc · 25.4 μ/(m² · day) | ASTM D-3985 | 9000 | 2400 |

Example 1 demonstrates how impact polypropylene copolymer used with the present invention can be prepared. Example 2 demonstrates how the resulting resin can be biaxially oriented. Comparative Example 3 demonstrates that the impact copolymer film prepared by the invention method has increased porosity and flexibility to the conventionally prepared homopolymer polypropylene resin film. Example 4 demonstrates that the films of the present invention can be used to prepare multilayer films having good clarity and low haze. In addition, Example 4 demonstrates that the two-layer film has a substantially lower haze than the film of Example 2. Example 5 demonstrates that the bi-axially oriented impact copolymer films can be made more porous with the addition of a filler to the present invention.

What is claimed is:

1. A polymer film comprising a biaxially oriented film of an impact copolymer polypropylene having a water-vapor transmission rate of greater than 5 g/m²·d (25 μm film) and less than 25 g/m²·d (25 μm film).

2. The polymer film of claim 1 wherein the final ethylene content of the impact copolymer polypropylene is from about 2 weight percent to about 20 weight percent.

3. The polymer film of claim 1 wherein the final ethylene content of the impact copolymer polypropylene is from about 5 weight percent to about 15 weight percent.

4. The polymer film of claim 1 wherein the final ethylene content of the impact copolymer polypropylene is about 10 weight percent.

5. The polymer film of claim 1 additionally comprising a filler.

6. The polymer film of claim 5 wherein the filler is calcium carbonate.

7. A multilayer polymer film comprising a first layer of a polymer film of claim 1, and attached thereto, a second polymer film.

8. The multilayer polymer film of claim 7 wherein the second polymer film is random ethylene-propylene copolymer.

9. The multilayer polymer film of claim 8 wherein the second polymer film is coextruded onto the polymer film of claim 1.

10. The multilayer polymer film of claim 9 additionally comprising a third polymer film attached to the other side of the first layer of a polymer film of claim 1.

11. A method for preparing an opaque biaxially oriented film of claim 1 comprising stretching in two dimensions a polypropylene-ethylene-propylene copolymer.

12. The method of claim 11, wherein the polypropylene-ethylene-propylene copolymer is prepared by sequential polymerization reaction processes.

13. The method of claim 12, wherein the sequential polymerization reaction processes comprise a first catalytic homopolymer polypropylene polymerization reaction process followed by a second catalytic heteropolymer propylene-ethylene polymerization reaction process.

14. The method of claim 13, wherein the sequential polymerization reaction processes produce an ethylene:propylene ratio from about 1:2 to about 2:1.

15. The method of claim 14, wherein the ethylene content of the polypropylene-ethylene-propylene copolymer is about 10 percent.

16. The method of claim 15, wherein the polypropylene-propylene-ethylene copolymer is stretched in the longitudinal direction to a ratio of about 5:1 and wherein said mixture is also stretched in the transverse direction to a ratio of about 8:1.

17. The method of claim 16 additionally comprising using the film to prepare a package for food.

18. The method of claim 16 additionally comprising using the film to prepare labeling media.

19. The method of claim 16 additionally comprising using the film to prepare a multilayer polymer film.

* * * * *